Jan. 7, 1969
B. J. YOUNG
3,420,627
CONCENTRATION OF PHOSPHORIC ACID
Filed Jan. 21, 1964
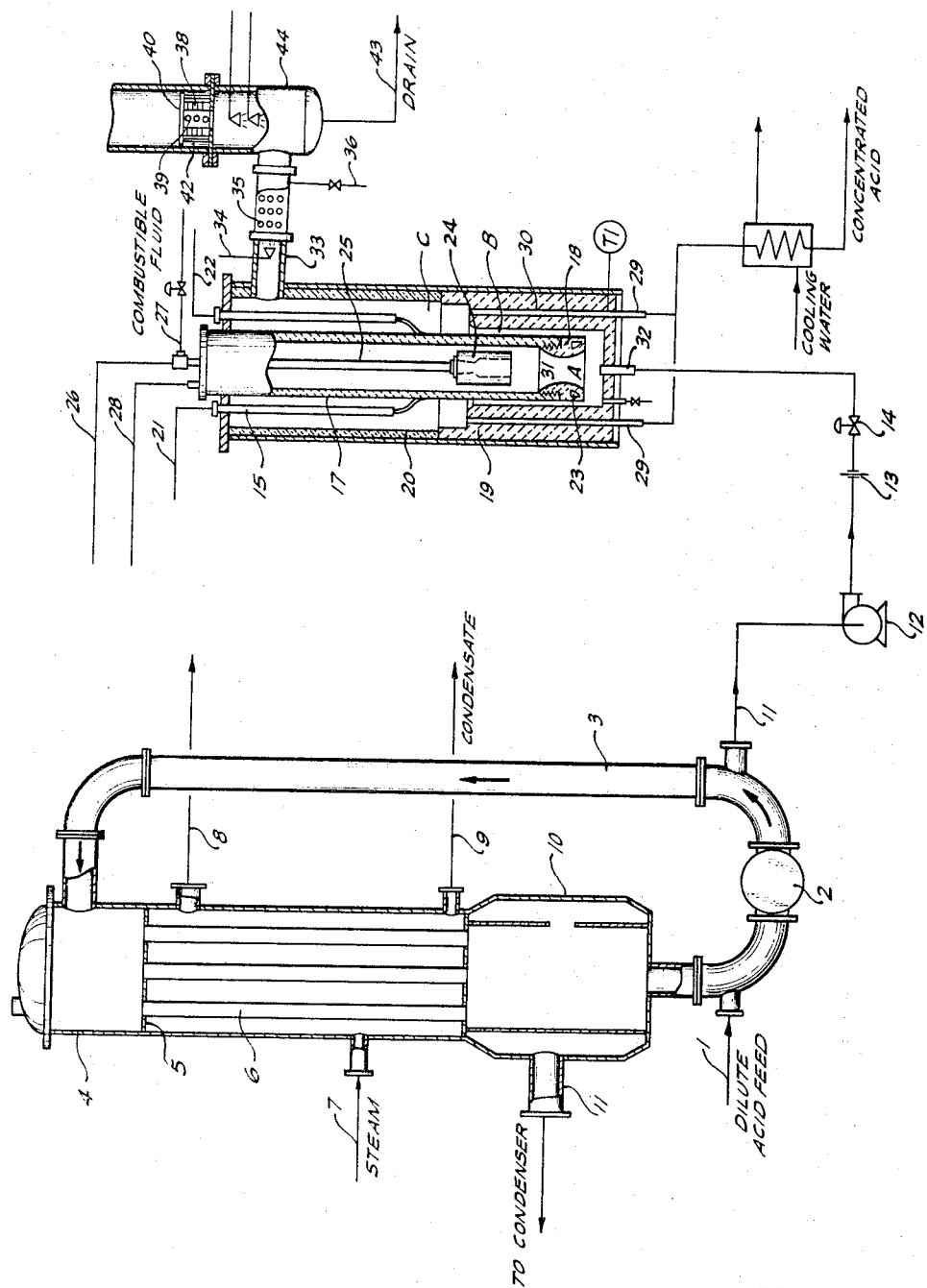
INVENTOR.
B. J. YOUNG
BY
ATTORNEY

United States Patent Office 3,420,627
Patented Jan. 7, 1969

3,420,627
CONCENTRATION OF PHOSPHORIC ACID
Billy J. Young, Fullerton, Calif., assignor to Union Oil Company of California, Los Angeles, Calif., a corporation of California
Filed Jan. 21, 1964, Ser. No. 339,300
U.S. Cl. 23—165      6 Claims
Int. Cl. C01b 25/22

This invention relates to a method for the concentration of wet-process phosphoric acid to an anhydrous phosphoric acid that contains condensed polyphosphoric acids.

Recently, it has been proposed that dilute phosphoric acid, which is conventionally marketed and handled at a maximum bulk commercial concentration of about 55 weight percent $P_2O_5$, be concentrated to an anhydrous state where polymeric phosphoric acids are present. In general, such concentrations range from about 69 to about 82 weight percent $P_2O_5$ on an impurity free basis. The phosphoric acid is thus concentrated so as to substantially eliminate all free water of solution therefrom and, in addition, a sufficient quantity of the water of constitution to dehydrate the orthophosphoric acid and form acyclic polyphosphoric acids in situ.

Several methods have been proposed for the concentration of dilute phosphoric acid to the anhydrous form. In one method, the phosphoric acid is concentrated under a vacuum by indirect heat transfer, preferably as a film in a falling film evaporator. In a second embodiment, the phosphoric acid is concentrated by direct contact with hot combustion gases in a submerged combustion heating technique or modified version thereof.

In the vacuum technique, a large inventory of acid is continuously circulated through the evaporating means while the acid feed is slowly added thereto and a proportionate amount of concentrated product is continuously withdrawn. Typical weight ratios of fresh feed to recycle in this technique are from about 1:50 to about 1:200. Because this technique employs such a large bulk of acid that is maintained at or nearly at the evaporation temperature, relatively long residence times from about 30 to about 200 minutes are encountered. In the submerged combustion technique, however, it is possible to concentrate the acid with very brief contact times, e.g., from about 0.1 to about 30 seconds or less.

Because of the relatively long residence times and large inventory of concentrated acid that is maintained at or near its boiling point, the vacuum concentration technique is subject to scaling and requires frequent shutdowns for cleaning. Additionally, the vacuum concentration technique employs metallic heat exchange surfaces that are in direct contact with the acid and the maximum temperature of the surfaces is thereby limited to less than 450° F. For most commercial operations this results in a limitation on the maximum concentration of the acid that can be obtained; generally the maximum concentration obtainable from vacuum techniques is about 75 weight percent $P_2O_5$ on an impurity free basis. Operating to produce such a highly concentrated product, however, greatly reduces the plant capacity. To illustrate, when the desired concentration of the final product is increased from about 70 to about 75 weight percent $P_2O_5$ on an impurity free basis, the capacity of a commercial vacuum concentration unit is approximately halved.

The direct contact of phosphoric acid with combustion gases is not limited by the use of metallic heat exchange surfaces and consequently any desired concentration of phosphoric acid can be obtained. Operation temperatures up to about 750° F. can be achieved by use of various chemically inert crucibles and liners for the concentrating vessels, preferably formed from graphite stock. The evaporation unit can be designed so as to provide relatively short liquid contact times and thereby avoid objectionable scale formation in the concentration unit. In a preferred embodiment, the submerged combustion apparatus disclosed in U.S. 3,104,947 by Switzer et al. is employed in my method. In this technique, hot combustion gases are directly contacted with the feed acid and the resulting mixture is passed as a suspension through a narrowly defined lifting zone into an enlarged section where the concentrated acid is separated and the hot combustion gases are removed from the top of the separation zone. In this technique, extremely short contact times of several seconds or less can be achieved. One disadvantage of this technique, however, is that the capacity of the unit is limited since the concentrator must be constructed from commercially available graphite stock and the annular zone through which the liquid acid and hot combustion gases are passed as a suspension must be carefully controlled. Accordingly, when employed to concentrate relatively dilute acids, e.g., 25 percent to about 63 percent $P_2O_5$ (impurity free basis) to a highly concentrated acid, the necessary capital investment for the submerged combustion concentrator is a major cost feature of the process.

It is an object of my invention to provide a method for the concentration of wet process phosphoric acid to any desired content of polyphosphoric acids.

It is also an object of my invention to provide a method for such concentration wherein the formation of scale deposits does not seriously limit the operation.

It is also an object of my invention to provide such method wherein the capital investment for such concentration is minimized.

Other and related objects will be apparent from the following disclosure.

The formation of scale deposits in the concentration of wet-process phosphoric acid to highly concentrated anhydrous acids that contain polyphosphoric acids is caused by precipitation of highly insoluble metallic salts of metaphosphoric acid. As the orthophosphoric acid is concentrated until more than about 95 percent of its free water is eliminated, the orthophosphoric acid is molecularly dehydrated to form pyrophosphoric acid in accordance with the following:

$$H_3PO_4 \rightarrow H_4P_2O_7 + H_2O$$

Continued heating of the phosphoric acid causes further molecular dehydration of the acid is as follows:

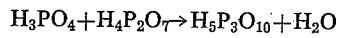

$$H_3PO_4 + H_4P_2O_7 \rightarrow H_5P_3O_{10} + H_2O$$

The formation of tripolyphosphoric acid does not occur at concentrations less than about 73 weight percent $P_2O_5$ on an impurity free basis. The concentration of the phosphoric acid to levels above the aforementioned, however, causes the formation of the tripolyphosphoric acid, e.g., at 75 weight percent $P_2O_5$ (impurity free basis), approximately 5 percent of the total phosphorus is present as tripolyphosphoric acid. Continued concentration of the acid e.g., up to about 82 weight percent $P_2O_5$ results in elimination of most of the orthophosphoric acid; approximately only 5 percent of the total phosphorus remaining as orthophosphoric acid at the latter concentration. Approximately 18–20 percent of the phosphorus at this concentration is as pyrophosphoric acid, the remainder of the phosphorus existing as the various acyclic forms such as tripoly, tetrapoly, pentapoly, hexapoly, heptapoly and higher phosphoric acids. The continued molecular dehydration of the phosphoric acid is as follows:

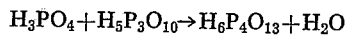

$$H_3PO_4 + H_5P_3O_{10} \rightarrow H_6P_4O_{13} + H_2O$$

A second reaction, however, occurs and is in equilibrium with the aforementioned wherein a slight amount of the cyclic polyphosphoric acids are cyclicized to metaphosphoric acids as follows:

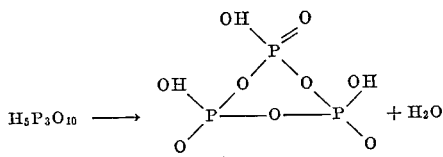

In relatively pure acids free from interfering metallic cations, the formation of cyclic metaphosphoric acids represents a very slight, almost negligible, reaction, and cyclization of the acid is not a serious problem until the acid concentration exceeds about 83 to 84 weight percent $P_2O_5$.

It is desired that the high concentration of acid be available for relatively impure phosphoric acids, including commercially available wet-process phosphoric acid which, at their aforementioned commercial concentrations, contain from about 1 to about 10 weight percent metallic impurities such as calcium, iron, aluminum, magnesium, chromium, vanadium, copper, zinc, etc. The aforementioned metallic cations, particularly calcium, are objectionable since they react with the cyclic metaphosphoric acids and precipitate as a highly insoluble deposit of metaphosphate. Precipitation of the metaphosphoric acid removes the material from the above equilibrium and hence there is a continuous formation of the metaphosphates, particularly at concentrations in excess of about 72 weight percent $P_2O_5$ on an impurity free basis.

A second factor that contributes to metaphosphate formation and scaling is that the vacuum concentrators are commonly operated with the acid passing over heated surfaces as a film in laminar flow. The heat conductivity of this film is low and therefore the layer of acid in contact with the heating surface is heated to a temperature above the bulk temperature. Consequently this boundary layer of acid exceeds in concentration the bulk of the acid and hence, appreciable metaphosphate formation occurs even though the bulk acid concentration is below about 72 weight percent $P_2O_5$, the minimum level believed necessary for formation of metaphosphates.

The metaphosphate precipitate is a highly refractory and scales the walls of the heating vessel employed in the concentration. When this scaling occurs, the heat transfer characteristics of the evaporator vessel are drastically limited and higher differential temperatures and/or longer residence times must be employed. Such changes are, however, more conducive to metaphosphate formation resulting in an accelerating rate of scaling during use. Hence, the vacuum concentration technique is highly sensitive to the formation of this precipitate and frequently must be shut down for cleaning and scraping of the deposits from the evaporator walls.

The direct heating technique, however, is not limited by scale deposits. More importantly, however, are the very short contact times employed at the concentration temperature, i.e., liquid residence times of from 0.1 to about 90 seconds; preferably from about 1 to about 15 seconds or less. Because the concentrated acid exists at the evaporation temperature for such brief periods of time, the formation of insoluble metaphosphates is not a serious problem. Consequently, the latter technique is not limited to any maximum concentration of phosphoric acid and can handle relatively impure acids that contain significant amounts of calcium impurities.

I have found that by combining the aforementioned concentration techniques in a method hereinafter described, a process that utilizes the significant advantages of each technique can be achieved which method is free from the aforementioned handicaps of each of the individual techniques.

In accordance with the foregoing, my invention comprises the use of a vacuum concentration technique to concentrate the dilute acid feed to the submerged combustion concentrator. Briefly, my invention comprises concentration of a dilute phosphoric acid containing from about 25 to 63 weight percent $P_2O_5$ to a substantially anhydrous phosphoric acid having an intermediate $P_2O_5$ content between about 69 and 73 weight percent and thereafter contacting the latter acid of intermediate concentration with hot combustion gases in a submerged combustion heating technique that employs very short contact times so as to concentrate the acid to the desired level of between about 73 and about 82 weight percent $P_2O_5$, all the aforementioned concentrations being on an impurity free basis. In this technique, the maximum capacity of the vacuum concentration unit is achieved and scale formation is not experienced because the acid is concentrated to the level below the minimum necessary for the above indicated molecular dehydration of tripolyphosphoric acid to metaphosphoric acid to occur. Because, however, the free water of solution is eliminated from the acid, the capacity of the submerged combustion technique is greatly increased; the volume of the dilute acid being reduced in proportion to the amount of the water eliminated in concentrating the acid from the low 27–63 weight percent $P_2O_5$ to the intermediate 69–73 percent $P_2O_5$ level.

Referring now to the figure there is illustrated the apparatus employed in my invention. The dilute phosphoric acid feed is introduced into the system through line 1 where it is admixed with a circulating inventory of phosphoric acid and pumped by pump 2 through circulating line 3 and tangentially introduced into the top of the evaporating vessel 4 where it is distributed by baffle plate 5 as a film of liquid that flows downwardly through the inside of tubes 6 disposed as a tube bundle within vessel 4. Steam from a suitable source at a temperature between about 125° and about 475° F. is introduced through line 7 in indirect heat exchange with the phosphoric acid flowing down the inside of the tubes 6. Non-condensibles are removed from the shell through line 8 and the steam condensate is removed through line 9. The acid falls from the tubes into the bottom of the concentrating vessel 10 which is connected to a suitable source of vacuum through line 11 such as a single or plural stage barometric jet condenser, not shown. In this manner, the absolute pressure of the system can be maintained below atmospheric, e.g., is low as about 10 millimeters mercury, preferably from about 35 to about 250 millimeters mercury pressure.

The majority of the acid is circulated through the system and the dilute acid feed is introduced slowly through line 1 to admix therewith. Product acid is removed through line 11 and passed by suitable means such as pump 12 to the direct contact with hot combustion gases in the submerged combustion heating technique. Where possible, I prefer to employ gravimetric flow of the acid through line 11 by positioning the vacuum concentration above the submerged combustion unit. The liquid flow rate to the submerged combustion unit can be measured by a suitable orifice or other volumetric flow indicator at 13 and the rate of flow controlled by valve 14.

A submerged combustion evaporator useful in my invention comprises a metal shell 15 with a centrally disposed dip tube 17 having a nozzle 18 at its lower end. The lower end of the dip tube is concentrically disposed within a central bore of a crucible 19 to form zone A between the lower end of nozzle 18 and the crucible and to form annular zone B between the dip tube and the crucible. The crucible and dip tube are preferably constructed of suitable corrosion resistant materials such as graphite. The upper end of the metal shell is also protected from corrosion by a similar graphite liner 20. Other suitable corrosion resistant lining can be employed such as polyethylene; however, more thermally stable material such as polytetrafluoroethylene (Teflon), polytrifluoroethylene (Kel-F), or epoxy resins are more suitable. Cooling fluid circulation lines 21 and 22 communicate with an annular cooling chamber 23 in nozzle 18. A suitable gas or oil burner 24 of conventional design, e.g., a tunnel type burner having a premixed air-fuel supply such as manufactured by the North American Manufacturing Company is positioned in a downward direction within the dip tube at the end of a combustible fluid supply line 25. Suitable fuel ignition means (not shown) are positioned in the burner, e.g., a spark plug or coil and actuated by ignition line 26 in the manner well known in the art. Although a single supply line 27 is shown, suitable for a premixed supply of combustible fuel oxidant, it is of course apparent that separate supply lines for each of these fluids could be provided and the mixing performed in burner 24, e.g., when an oil burner is employed the liquid oil fuel and air supply can be separate. A diluent supply line 28 is provided for introduction of a cool, inert diluent gas useful for temperature control, e.g., preferably air is employed. One or more liquid excess product withdrawal lines 29 are provided extending to longitudinal bores 30 in crucible 19 to detrainment zone C. It is of course apparent that withdrawal lines 26 and bores 30 need not extend in a longitudinal direction but can extend radially from chamber C. At the base of the crucible, directly beneath the combustion gas discharge passageway 31 of nozzle 18 is positioned the cold liquid feed line 32. If desired the liquid feed can also be introduced into the top of crucible 19, however, introduction through line 32 is preferred. The exhaust gas is withdrawn from the upper end of detrainment separator C by line 33. Water spray means 34 can be provided within this conduit and an entrainment separator 35 can be used to coalesce the entrained liquid. It is preferred to employ the water spray 34 only for cleaning purposes and not during normal operation of the plant so as to avoid dilution of the coalesced liquid removed through line 36. A second water spray section 37 is provided and aerosol separator is provided to recover acid aerosols formed in the concentration. As shown, this separator comprises a series of annular rings or discs 38 of a suitable woven fibrous material, e.g., felt or glass fibers, which are assembled on a perforated cylinder 39 and compressed between flanges 40 and 41 by tie bolts 42. The upper end of screen 39 is sealed to gas flow by baffle plate 40 which directs the gas radially through the felt fibers.

When fresh water is supplied to sprays 37, a dilute about 25 weight percent $P_2O_5$ acid solution is recovered via line 33. This material is sent to a suitable waste disposal treatment. If desired, the effluent from line 24 can be recycled to the feed providing a dilute phosphoric acid is employed as the scrubbing liquid in sprays 37. This however necessitates use of corrosion resistant material for the stack 44.

It is of course apparent that other separators such as electrostatic separators can also be used in lieu of section 37. Other useful separators are described in chapter 24 of Chemistry and Technology of Fertilizers by Sauchelli (1960).

To illustrate the use of my invention, a dilute 54 weight percent $P_2O_5$ wet-process phosphoric acid containing various metallic impurities and having the following composition is supplied to the concentrating system through line 1.

TABLE 1

| Component: | Weight percent |
|---|---|
| $P_2O_5$ | 52 |
| Sulfate as $SO_3$ | 2.4 |
| Iron as the oxide | 0.8 |
| Aluminum as the oxide | 2.7 |
| Magnesium as the oxide | 0.1 |
| Zinc as the oxide | 0.2 |
| Chromium as the oxide | 0.1 |
| Vanadium as the oxide | 0.2 |

The acid is supplied to the vacuum concentration at a rate of about 3.3 gallons per minute. The vacuum maintained on the acid by a barometric condenser is about 50 millimeters mercury and in the vacuum concentration, the fluoride and silica impurities are volatilized as silica tetrafluoride and the bulk of the free water of solution of the phosphoric acid feed is eliminated to provide a concentrated acid having a bulk $P_2O_5$ content of about 65 weight percent $P_2O_5$ that is circulated through line 3. The acid concentration on an impurity free basis is about 71 percent $P_2O_5$. The liquid residence time within the concentrator is approximately 95 minutes; however, the formation of appreciable amounts of metaphosphoric acids is precluded by removing the acid and supplying dilute acid feed so as to maintain the concentration of the acid product below about 71 weight percent $P_2O_5$ on an impurity free basis. Approximately 2.6 gallons per minute of acid having the aforementioned intermediate concentration of about 65 weight percent $P_2O_5$ are withdrawn through line 11 and supplied to the submerged combustion unit through acid feed line 32. Combustible fluid and air are supplied through line 27, ignited and the temperature of the hot combustion gases is temperated to about 1000° and 2000° F. by the introduction of from 20 to 200 percent excess air through line 28. The hot combustion gases contact the acid and flow upwardly through the annular zone B that is between about 0.1 and about 1.5 inches in annular width. In zone C the acid separates from the hot combustion gases which are passed to the stack through the detrainment and aerosol separation units. The hot concentrated acid is removed through lines 29, cooled and recovered as a concentrated acid having a $P_2O_5$ content of about 77 weight percent $P_2O_5$ on an impurity free basis; 71 weight percent on a bulk basis. Approximately 2.4 gallons per minute of acid are recovered and the total $P_2O_5$ loss is less than about 0.1 weight percent of the total $P_2O_5$ in the dilute feed acid.

When operating in this fashion, the vacuum concentrator can be operated for extended periods of time without shutdowns for removal of the calcium metaphosphate scale. When the vacuum concentration unit is employed to concentrate the aforementioned feed to the maximum possible level, i.e., about 70 weight percent $P_2O_5$ on a bulk basis or about 75 weight percent impurity free basis, vacuum concentrator is approximately half that employed in my method. Additionally, the vacuum concentration unit must be shut down at weekly intervals to remove the scale deposits.

When the submerged combustion unit is employed to concentrate the dilute 52 percent $P_2O_5$ acid to the level obtained in my invention, i.e., 71 bulk weight percent $P_2O_5$, the capacity of the unit is reduced about 27 percent from about 2.6 gallons per minute to about 1.9 gallons per minute.

The preceding illustrative example is intended solely to illustrate a mode of practicing my invention and to demonstrate the results obtainable thereby. It is not intended that this example be construed as limiting of the invention which is defined by the method steps set forth in the succeeding claims.

I claim:
1. The method for preparing a highly concentrated, anhydrous phosphoric acid that comprises introducing a dilute phosphoric acid having a concentration between about 27 and about 63 weight percent $P_2O_5$ into a vacuum concentration unit and heating said acid therein for a period greater than about 30 minutes to a temperature between about 125° and about 450° F. while maintaining a subatmospheric pressure on said acid between about 10 and about 250 millimeters mercury absolute pressure so as to eliminate the free water of solution and concentrate said dilute phosphoric acid to an intermediate concentration between about 69 and about 73 weight percent $P_2O_5$; withdrawing said phosphoric acid at said intermediate concentration and before insoluble metaphosphates are formed and passing said phosphoric acid of said intermediate concentration to a final evaporation step wherein said acid is directly contacted with hot combustion gases having a temperature between about 1000° and 2000° F., maintaining said acid in contact with said hot combustion gases for a period of time between about 0.1 and about 90 seconds so as to increase the concentration of said acid by about 2 to about 13 weight percent $P_2O_5$, separating said acid from said hot combustion gases and withdrawing said acid from said contacting as said highly concentrated anhydrous phosphoric acid having a $P_2O_5$ content between about 73 and about 82 weight percent, all said concentrations being expressed on an impurity free basis.

2. The method of claim 1 wherein said dilute phosphoric acid is concentrated in said vacuum concentration step by flowing said acid downwardly as a film across a metallic heat exchange surface.

3. The method of claim 2 wherein the liquid residence time of said phosphoric acid in said vacuum evaporation step is between about 30 and about 200 minutes.

4. The method of claim 1 wherein said phosphoric acid of said intermediate concentration is admixed with said hot combustion gases and passed upwardly as an annular confined stream having a width between about 0.1 and about 1.5 inches in indirect heat exchange with a downwardly flowing stream of said hot combustion gases.

5. The method of claim 4 wherein the heat release of said burner is controlled to between about 5000 and about 75,000 B.t.u. per hour per inch of diameter of said stream of hot combustion gases.

6. The method of claim 1 wherein said stream of hot combustion gases is passed through a nozzle having a constricted passageway into contact with said phosphoric acid of said intermediate concentration and a heat exchange medium is circulated through an interior chamber of said nozzle so as to cool the surfaces of said nozzle that are directly contacted by said acid.

References Cited

UNITED STATES PATENTS

| | | | |
|---|---|---|---|
| 3,317,306 | 5/1967 | Getsinger et al. | 23—165 X |
| 2,917,367 | 12/1959 | Hodges et al. | 23—165 |
| 2,933,372 | 4/1960 | Manning | 23—165 |
| 2,962,357 | 11/1960 | Williams et al. | 23—165 |
| 2,987,376 | 6/1961 | Gloss | 23—165 |
| 3,104,947 | 9/1963 | Switzer et al. | 23—165 X |
| 3,192,013 | 6/1965 | Young | 23—165 |
| 3,316,061 | 4/1967 | Csendes et al. | 23—165 |

EARL C. THOMAS, *Primary Examiner.*

ARTHUR J. GREIF, *Assistant Examiner.*

U.S. Cl. X.R.

159—47